(12) United States Patent
Miura et al.

(10) Patent No.: US 7,920,245 B2
(45) Date of Patent: Apr. 5, 2011

(54) LIGHT-MODULATING MATERIAL WITH TRANSMISSIVITY CHANGING IN ELECTRIFIED STATE AND VEHICLE USING THE SAME

(75) Inventors: Hiroaki Miura, Kamakura (JP); Hidekazu Takahashi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 600 days.

(21) Appl. No.: 11/064,517

(22) Filed: Feb. 24, 2005

(65) Prior Publication Data

US 2005/0140917 A1 Jun. 30, 2005

(30) Foreign Application Priority Data

Mar. 4, 2004 (JP) ................. 2004-060616

(51) Int. Cl.
 *G02F 1/1333* (2006.01)
 *C09K 19/02* (2006.01)
(52) U.S. Cl. .............. 349/183; 349/86; 349/88; 349/89; 349/90; 349/91; 349/184; 349/185; 349/186
(58) Field of Classification Search .......... 349/183–186, 349/86, 124, 126, 128–132, 155–157, 177, 349/16, 195, 197; 359/603, 609
See application file for complete search history.

(56) References Cited

U.S. PATENT DOCUMENTS

| 5,099,343 | A | * | 3/1992 | Margerum et al. ............. 349/63 |
| 5,635,106 | A | * | 6/1997 | Basturk et al. ........... 252/299.01 |
| 5,748,272 | A | * | 5/1998 | Tanaka et al. ................... 349/86 |
| 5,844,643 | A | * | 12/1998 | Onishi et al. .................... 349/93 |
| 5,920,368 | A | * | 7/1999 | Hatano et al. ................. 349/169 |
| 6,067,135 | A | * | 5/2000 | Shimizu et al. ................. 349/86 |
| 6,266,109 | B1 | | 7/2001 | Yamaguchi et al. |
| 6,618,103 | B2 | * | 9/2003 | Hisamitsu et al. ............. 349/78 |
| 6,618,104 | B1 | * | 9/2003 | Date et al. ....................... 349/86 |
| 2002/0071646 | A1 | * | 6/2002 | Eggleton et al. ............. 385/125 |
| 2005/0111807 | A1 | * | 5/2005 | Hino ............................ 385/129 |

FOREIGN PATENT DOCUMENTS

| EP | 000180592 B1 * | 2/1995 |
| JP | 406075249 * | 3/1994 |
| JP | 11-183937 A | 7/1999 |
| JP | 2001-180264 A | 7/2001 |
| JP | 2001-249363 A | 9/2001 |
| WO | WO 83/01016 A1 | 3/1983 |
| WO | WO 85/04262 A1 | 9/1985 |
| WO | WO-2004/005426 A1 | 1/2004 |

OTHER PUBLICATIONS

Office Action issued by Japanese Patent Office dated Nov. 10, 2009 for Japanese Patent Application No. 2004-060616.

* cited by examiner

*Primary Examiner* — Hoan C Nguyen
(74) *Attorney, Agent, or Firm* — Foley & Lardner LLP

(57) ABSTRACT

A light-modulating material includes a transparent front surface layer, an intermediate layer including a liquid crystal forming an isotropic phase and a transparent back surface layer, laminated in this order.

12 Claims, 6 Drawing Sheets

LIGHT-MODULATING MATERIAL WITH TRANSMISSIVITY CHANGING IN ELECTRIFIED STATE AND VEHICLE USING THE SAME

BACKGROUND OF THE INVENTION

1. Field of the Invention

The present invention relates to a light-modulating material with a liquid crystal. A light-modulating material of the present invention is used as, for example, a front glass or a front side glass of a vehicle.

2. Description of Related Art

Penetration routs of light and heat into interior of a vehicle parked under burning sun in the summer season include a ceiling, a wind shield, a rear glass, a front side glass, a rear side glass, an upper part of doors, etc.

In many cases of the conventional vehicles, a laminated glass has been used as a wind shield, while a single glass as a front side glass. To enhance safety, an intermediate film may be used which contributes to improve strength, however, it has little thermal function. Therefore, high amount of light energy and heat energy penetrates into interior of a vehicle parked under burning sun, making interior vehicle environment very serious. It also reduces fuel economy of air conditioning equipment, which may provide bad effects on environment from macroscopic view point.

In building also, this problem has been studied. For example, by inflow of light energy and heat energy through windows, loads to air conditioning equipment in a room and a human body increase. Just like in a vehicle, inflow of high amount of energy worsens fuel economy of air conditioning equipment, which may provide bad effects on environment from macroscopic view point.

To solve these problems, such techniques have been proposed recently as to reduce temperature increase in a room and cooling load by shielding light energy and heat energy inflow into a building or a vehicle interior. As an example of such measures, a glass with light-modulating function is proposed. When both characteristics of transparency as a window glass and heat ray reflection/absorbability to shield direct sunlight energy, along with switching function as required are maintained, it is possible to introduce required amount of light into a room when needed. If such control is possible, it is useful to not only reduce load to a human body or cooling equipment but also in view of energy saving.

As specific measures to furnish light-modulating function to a glass, an electrochromic element (hereinafter called "an EC element") and a liquid crystal element are known.

An EC element enables control of transmitting amount of direct sunlight energy via light absorption by using a material accompanying spectral changes by an electrochemical redox reaction such as tungsten oxide, prussian blue, etc. However, because of absorption of direct sunlight energy, an EC element, when it is used to a glass to partition interior and exterior of a room, energy thus absorbed is re-emissioned into a room, causing increase in room temperature.

A liquid crystal element is composed of a material with a function to change alignment by voltage, and change light perspectiveness by alignment of a liquid crystal. As a liquid crystal element, a nematic liquid crystal element with a curve-shaped aligned phase (JP-S58-501631), a liquid crystal element obtained by a phase separation method (JP-S61-502128), and the like are known. These elements work based on the following principle.

In an a liquid crystal element described in these gazettes, prepared by dispersion of small droplets of a liquid crystal substance into a cheap polymer, a liquid crystals align along a curved surface of a polymer wall in non-electrified state. By this effect, optical path is twisted and light reflects and scatters at interface between a polymer and liquid crystal droplets, and thus providing milky white color.

On the other hand, when voltage is impressed to a liquid crystal element, liquid crystals inside liquid crystal droplets align in the direction of electric field by external electric field. At this time, by selecting refractive index of a liquid crystal, $n_o$, and refractive index of a polymer, $n_p$, so that they are coincident, it is possible for incidented light vertically to a liquid crystal element surface to pass without reflection at interface between a liquid crystal and a polymer and thus makes a liquid crystal element transparent.

BRIEF SUMMARY OF THE INVENTION

However, there are some items desirable to be improved, when the liquid crystal element is applied to a glass as partitioning between interior and exterior of a room. Firstly, a problem of energy transmission amount is preferred to be improved. The liquid crystal element can secure transparency in electrified state and can be non-perspective in non-electrified state. However, because most of the incidented light to a liquid crystal element in non-electrified state scatters to opposite side of an incident side, there is little reduction of transmitting amount of direct sunlight energy compared with the case situation of electrified state. Therefore, high amount of direct sunlight energy penetrates into a room.

Secondly, a problem of fail-safe is preferred to be improved. Because the liquid crystal has mechanism to secure perspectiveness when voltage is impressed, front view is impaired in vehicle accident when voltage is not impressed.

Thirdly, a problem of visible light transmissivity is preferred to be improved. When a glass is placed at a front surface of a vehicle, transmissivity in transparent state usually has to satisfy specified level by a law. For example in Japan, visible light transmissivity (Tv) shall be not lower than 70%. When a glass containing a liquid crystal element is applied, it is difficult to obtain sufficient transmissivity because of presence of a polalizing plate, etc.

Lastly, a problem of angle dependence of liquid crystal reflectivity is preferred to be improved. A liquid crystal when aligned by voltage impression has angle dependence of reflectivity and even if it seems transparent viewed from a front side, there may be a problem of non-transparency when viewed from other angles.

As stated above, to apply a light-modulating material containing a liquid crystal element to a glass for a vehicle or building, there are problems required to be solved. It is an object of the present invention to provide means to increase usefulness of a light-modulating material containing a liquid crystal element and to enhance adaptability to a vehicle or building.

In an aspect of the invention, a light-modulating material includes a transparent front surface layer, an intermediate layer including a liquid crystal forming an isotropic phase and a transparent back surface layer, laminated in this order.

A light-modulating material of the present invention placed with a liquid crystal of an isotropic phase in an intermediate layer has characteristics very suitable to an application such as a vehicle or building.

DETAILED DESCRIPTION OF THE INVENTION

A light-modulating material of the present invention is characterized by having a transparent front surface layer and a transparent back surface layer and placing a liquid crystal forming an isotropic phase in an intermediate layer. By using a liquid crystal of an isotropic phase, it is possible to obtain the following various effects. However, technical scope of the present invention is by no means limited to a light-modulating material having all of the following effects.

By using a light-modulating material of the present invention, when it is desired for direct sunlight energy not to penetrate through a glass window of a vehicle parked under burning sun or a building irradiated by sunlight, it is possible to reduce transmission amount of direct sunlight energy. That is, by the present invention, it is possible to improve environment of a room inside, reduce cooling load, etc.

Because a light-modulating material of the present invention uses a liquid crystal of an isotropic phase, it is preferable in view of fail safe. That is, even when voltage cannot be impressed to a liquid crystal by an accident of a vehicle, light transmittance of a glass can be retained. Therefore, a problem of front view loss by an accident can be solved.

Because of using a liquid crystal of an isotropic phase, the present invention provides sufficient visible light transmissivity. As described above, while a glass used as a front window of a vehicle shall have visible light transmissivity (Tv) not lower than 70% in Japan, it is possible to clear this standard. However, technical scope in application products of a light-modulating material of the present invention is not necessarily limited to one having visible light transmissivity (Tv) not lower than 70%. For example, the present invention can be applicable to such a glass as in building not required to have visible light transmissivity (Tv) not lower than 70%. A light-modulating material used in such an application that satisfies requirement of the present invention or falls in equivalent range is included in technical scope of the present invention. In addition to this, because of using a liquid crystal with an isotropic phase, a problem of angle dependency of a liquid crystal can also be solved.

Next, a light-modulating material of the present invention will be explained in more detail. In the present invention, values of solar radiation reflectivity (Re), solar radiation transmissivity (Te), visible light reflectivity (Rv) and visible light transmissivity (Tv) are such values as measured in accordance with JIS (Japan Industrial Standard) R3106.

Figure 1:
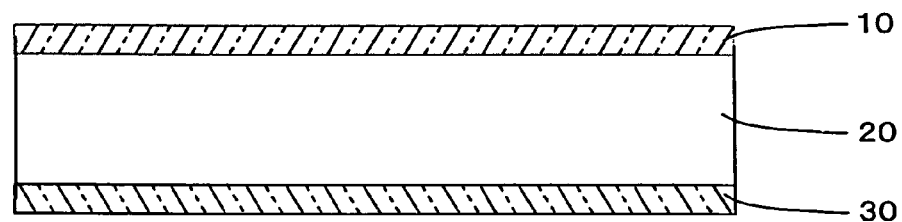
FIG. 1 is a cross-sectional schematic view of a light-modulating material of the present invention.

FIG. 1 is a cross-sectional schematic view of a light-modulating material of the present invention. In a light-modulating material 1, a front surface layer 10, an intermediate layer 20 and a back surface layer 30 are laminated in this order. However, presence of layers other than these layers shall not be excluded. At exterior sides or between them, other layers may be laminated if necessary. Both the front surface layer 10 and the back surface layer 30 are transparent. The intermediate layer 20 is filled with a liquid crystal forming an isotropic phase (not shown).

In the present invention, "light-modulating material" means a material in general having property which changes characteristics of incidended light. For example, a specific light-modulating material includes a light-modulating glass made of a glass substrate, a light-modulating film made of a plastic film substrate, and the like and they are included as lower concept of a light-modulating material.

In the present invention, "forming an isotropic phase" means to form an isotropic phase in a state without special external factor such as voltage. Preferably, a liquid crystal forming an isotropic phase at ordinary temperature is filled. "Ordinary temperature" here means temperature range at which a light-modulating material is generally used, specifically temperature range from about 20 to 40° C. In the present invention, "an isotropic phase" means a state that a single or mixture of a liquid crystal molecule showing a liquid crystalline nature is not in so-called a liquid crystal state aligned in a certain direction but in non-oriented order state.

A liquid crystal to be filled preferably has isotropic phase transition temperature from −40 to 40° C. and is such a liquid crystal as forms an isotropic phase at temperature not lower than isotropic phase transition temperature. "Isotropic phase transition temperature" here means temperature at which a single or mixture of a liquid crystal molecule showing a liquid crystalline nature changes from so-called a liquid crystal state aligned in a certain direction to a state without oriented order.

In the present invention, this isotropic phase transition temperature is preferably as low as possible, although if isotropic phase transition temperature is in the range from −40 to 40° C., it is sufficiently possible to attain change between a aligned phase and an isotropic phase under environment generally used for a light-modulating material.

The present inventors noticed a state where an isotropic phase is formed, that is, so to speak a state where aspect of usually utilized state as, so to speak, a liquid crystal is not formed, and have completed the present invention.

Figure 2:
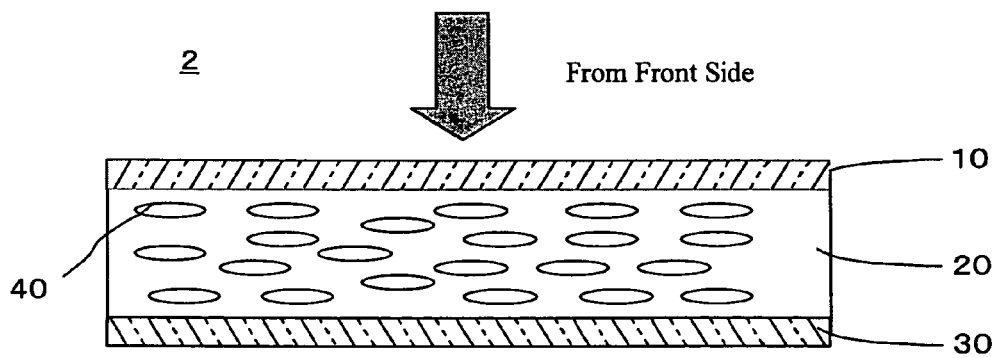
FIG. 2 is a cross-sectional schematic view of a light-modulating material 2, wherein an intermediate layer 20 including a liquid crystal 40 forming an aligned phase is placed between a front surface layer 10 and a back surface layer 30.
Figure 3:
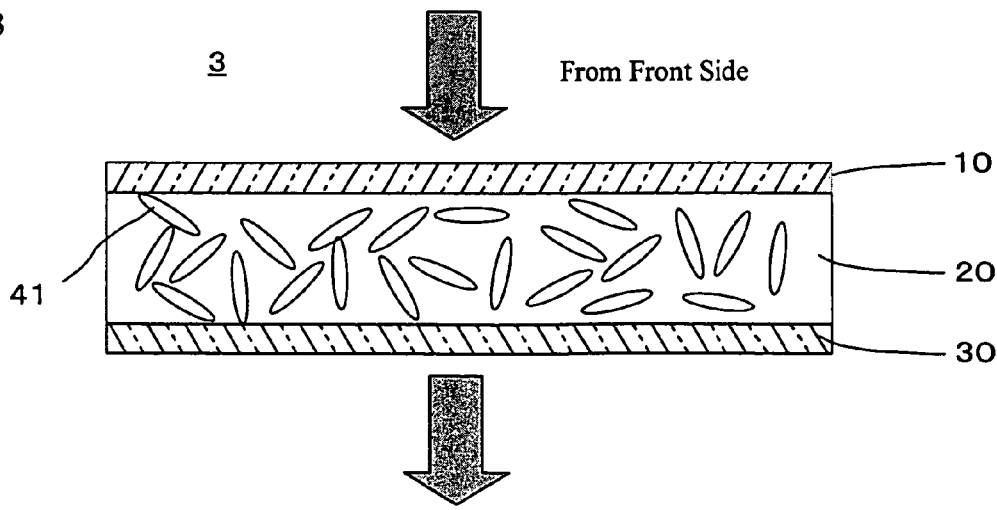
FIG. 3 is a cross-sectional schematic view of a light-modulating material 3 of the present invention, wherein an intermediate layer 20 including a liquid crystal 41 forming an isotropic phase is placed between a front surface layer 10 and a back surface layer 30.

A state where a liquid crystal forms an isotropic phase is explained by comparing with a state of an aligned phase is formed just like a conventional liquid crystal. FIG. 2 is a cross-sectional schematic view of a light-modulating material 2, wherein an intermediate layer 20 including a liquid crystal 40 forming a aligned phase is placed between a front surface layer 10 and a back surface layer 30. FIG. 3 is a cross-sectional schematic view of a light-modulating material 3 of the present invention, wherein an intermediate layer 20 including a liquid crystal 41 forming an isotropic phase is placed between a front surface layer 10 and a back surface layer 30.

In a state shown in FIG. 2, the liquid crystal 40 is aligned and the intermediate layer 20 has anisotropic refractive index. In the case that the intermediate layer 20 is a nematic liquid crystal, and when a light-modulating material is observed from front side direction, light is scattered by the intermediate layer 20 and the back surface is not perspectable and thus the light-modulating material looks to be white turbid state. While in a state shown in FIG. 3, because a liquid crystal 41 is not aligned and the intermediate layer 20 does not have anisotropic refractive index, the back surface layer is perspectable.

A liquid crystal compound placed in an intermediate layer 20 is not especially limited, however, it is preferable to select under consideration that transition temperature between a nematic phase and an isotropic phase (NI point) is in normal temperature range. Furthermore, if a liquid crystal used in the present invention is such a liquid crystal as shows dielectric anisotropy, either normal light refractive index or abnormal light refractive index can be aligned by stimulus such as temperature, light, voltage impression, and the like, and by matching with the other refractive index components, can express function such as reflectance, and the like.

A liquid crystal molecules used in the present invention can be compounds with bonding from two to four ring compounds such as a benzene ring, a cyclohexane ring, a cyclohexene ring, along with hetero-cycles such as a pyrimidine ring, a dioxane ring, a pyridine ring, etc. In the part of those bonding parts, a mesogen group can be used such as an ester bond, an acetylene bond (an ethynylene group), an ethane bond (an ethylene group), an ethylene bond (an ethenylene group), an azo bond, etc. As an end group, or a side substituent group, a cyano group, a fluoro group, an alkyl group, an alkenyl group, an alkoxy group can be used. These liquid crystals may be used as they are, however, practically they are used in combination of two or more kinds in many cases. In the present invention, a liquid crystal and its mixture may be described as a liquid crystal as a whole.

These liquid crystals or a mixed liquid crystal are preferably adjusted to have an isotropic phase at normal temperature. Specific examples of liquid crystal molecules forming an aligned phase at normal temperature as they are include 4-pentyl-4'-cyanobiphenyl (5CB), 4-hexyl-4'-cyanobiphenyl (6CB), 4-hexyl-4'-cyanophenylpyridine, 4-hexyl-4'-propylphenylcyclohexane, 4-methyl-4'-propyldicyclohexane, 4-hexyl-4'-methoxydicyclohexane, etc.

To form an isotropic phase in a liquid crystal, a material forming an isotropic phase by a liquid crystal as it is may be used, as described above, or an isotropic phase may be formed by mixing various liquid crystals or by using a dispersion material. When an isotropic phase is formed by using the dispersion material, it is possible to form the isotropic phase in wide temperature range. Therefore, it is useful when used to such an application as requires wide service temperature as in automobiles. As the dispersion material, such as a bended type molecule is used. A specific example of the dispersion material includes such a type similar to a liquid crystal used and has backbone structure, as a mesogen group, of a cis-ethylene group, a cis-ethylene group whose hydrogen is substituted with a halogen group such as fluoro group, a bromo group, and the like, a cis-azo group, etc.

To reduce visible light transmissivity by changing an intermediate layer 20 forming an isotropic phase and showing high visible light transmissivity, liquid crystal molecules are aligned by using suitable stimulus, such as temperature, light, voltage impression, and the like, in accordance with liquid crystal types. For example, a liquid crystal is aligned by voltage impression. "Liquid crystal molecule is aligned" here means for a liquid crystal molecules to have order responsive to electric field generated by voltage impression and to align perpendicular or parallel to electric field. Waveform of voltage to be impressed is not especially limited as long as it satisfies condition to align liquid crystal molecules.

Figure 4:
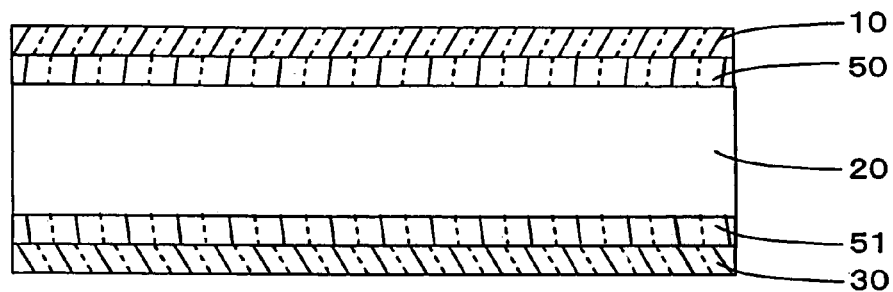
FIG. 4 is a cross-sectional schematic view of a light-modulating material, wherein a pair of electrodes (50, 51) is set at a front surface layer 10 and a back surface layer 30 and an intermediate layer 20 including a liquid crystal is placed between the electrodes (50, 51).

To imprint voltage, a pair of electrodes is set at a front surface layer 10 and a back surface layer 30 and a liquid crystal is placed between the front surface layer 10 and the back surface layer 30 set with each electrode. FIG. 4 is a cross-sectional schematic view of a light-modulating material, wherein a pair of electrodes (50, 51) is set at the front surface layer 10 and the back surface layer 30 and an intermediate layer 20 including a liquid crystal is placed between the electrodes (50, 51). The electrodes are preferably transparent ones. Which one of the front surface layer 10 and the back surface layer 30 is selected as an anode side or a cathode side is not especially limited as long as the anode electrode or cathode electrode is placed at one of the front surface layer 10 and the back surface layer 30 and voltage is impressed to a liquid crystal present in the intermediate layer 20. When a liquid crystal forming an isotropic phase is changed by stimulus of voltage impression, the liquid crystal forms an aligned phase under electrified state to the electrode, while an isotropic phase under non-electrified state to the electrode. By this mechanism, light-modulating function by alignment is expressed under electrified state, while securing visible transmissivity (Tv) under non-electrified state.

Figure 5:
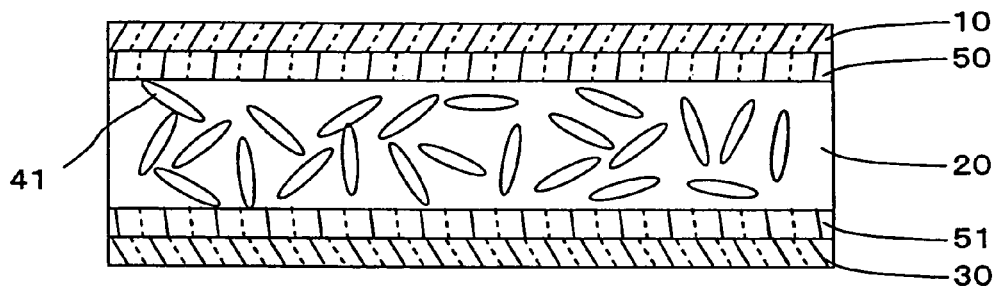
FIG. 5 is a cross-sectional schematic view of a light-modulating material, wherein voltage is not impressed at the electrodes (50, 51) and a liquid crystal 41 forms an isotropic phase.
Figure 6:
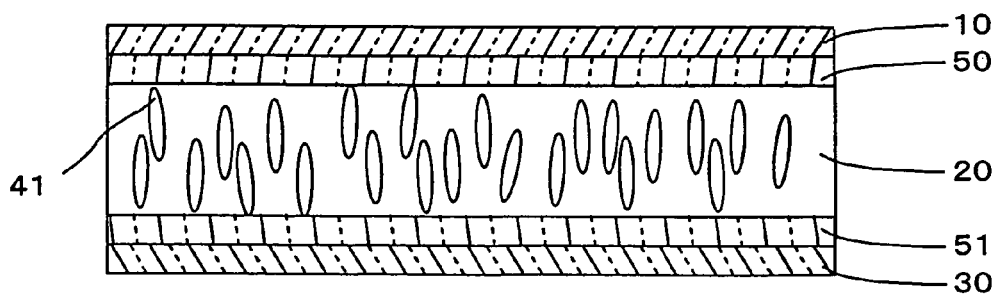
FIG. 6 is a cross-sectional schematic view of a light-modulating material, wherein a liquid crystal 41 is aligned in a direction parallel to a direction of voltage difference generation.
Figure 7:
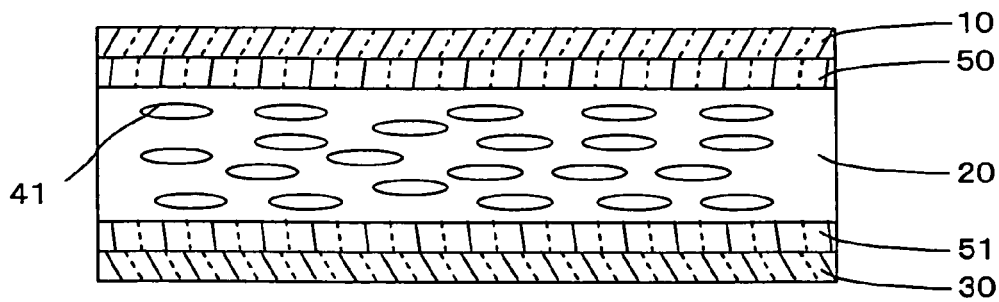
FIG. 7 is a cross-sectional schematic view of a light-modulating material, wherein a liquid crystal is aligned in a direction perpendicular to a direction of voltage difference generation.

A method for controlling a liquid crystal by using voltage impression as stimulus is explained using figures. FIG. 5 is a cross-sectional schematic view of a light-modulating material, wherein voltage is not impressed at the electrodes (50, 51) and a liquid crystal 41 forms an isotropic phase. When voltage is impressed at the electrodes (50, 51) of a light-modulating material 4, a liquid crystal 41 forms an aligned phase and an aligned state as shown by FIG. 6 or FIG. 7. FIG. 6 is a cross-sectional schematic view of a light-modulating material, wherein a liquid crystal 41 is aligned in a direction parallel to a direction of voltage difference generation. FIG. 7 is a cross-sectional schematic view of a light-modulating material, wherein a liquid crystal is aligned in a direction perpendicular to a direction of voltage difference generation. Which aligned state shown by FIG. 6 or FIG. 7 is formed is determined by positive or negative anisotropic dielectricity of a liquid crystal.

Voltage to be impressed for alignment of a liquid crystal by voltage impression may be determined in accordance with thickness of an intermediate layer 20 or types of liquid crystal molecules and not especially limited, however, preferably approximately from 3 to 200 V.

Figure 8:
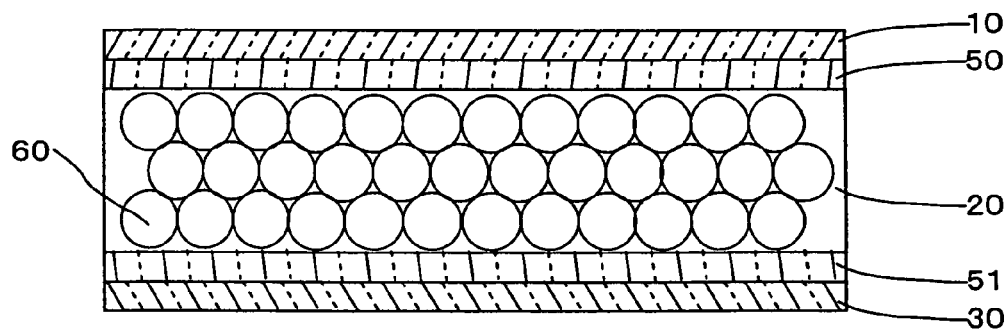
FIG. 8 is a cross-sectional schematic view of a light-modulating material, wherein periodical structure including a spherical structure 60 is placed in an intermediate layer 20.
Figure 9:
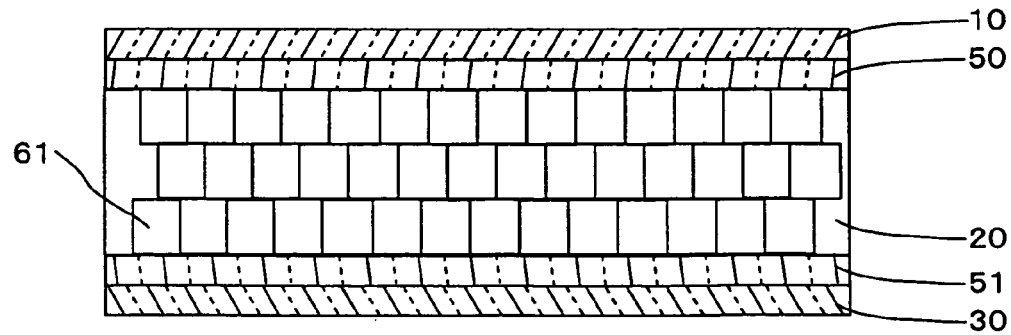
FIG. 9 is a cross-sectional schematic view of a light-modulating material, wherein periodical structure including a cubic structure 61 is placed in an intermediate layer 20.

To prevent penetration of direct sunlight energy into a room, it is effective to increase sunlight radiation reflectivity (Re) in a light-modulating material. In view of increasing sunlight radiation reflectivity (Re), as shown by FIG. 8 and FIG. 9, it is preferable that an intermediate layer 20 is composed of periodic structure formed by structure (60, 61) and a liquid crystal is present inside the structure (60, 61). A liquid crystal is present inside the structure (60, 61) forming periodic structure in the intermediate layer 20, however, it may be present between the structure (60, 61) depending on the cases. FIG. 8 is a cross-sectional schematic view of a light-modulating material, wherein periodical structure including spherical structure 60 is formed in an intermediate layer 20. FIG. 9 is a cross-sectional schematic view of a light-modulating material, wherein periodical structure including cubic structure 61 is formed in an intermediate layer 20. When a liquid crystal is aligned in periodical structure, as shown by FIG. 8 and FIG. 9, coloring caused by reflection is observed. By widening the reflection wavelength, it is possible to increase sunlight radiation reflectivity (Re) by reflection of whole region of visible light. Altimately, it is also possible to shift between two states: sunlight radiation reflectivity (Re) of 100% and visible light transmissivity (Tv) not lower than 70%, by alignment control of a liquid crystal.

Figure 10:
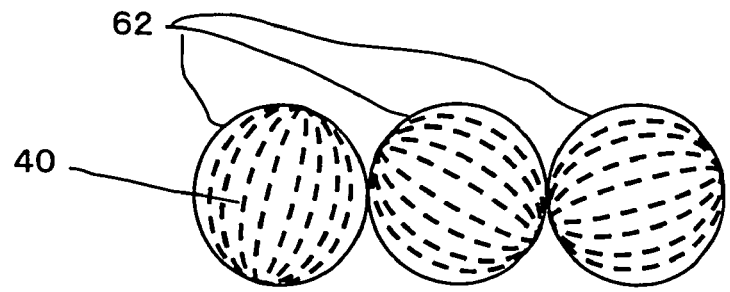
FIG. 10 is a schematic view of a liquid crystal forming an aligned state in a structure.
Figure 11:
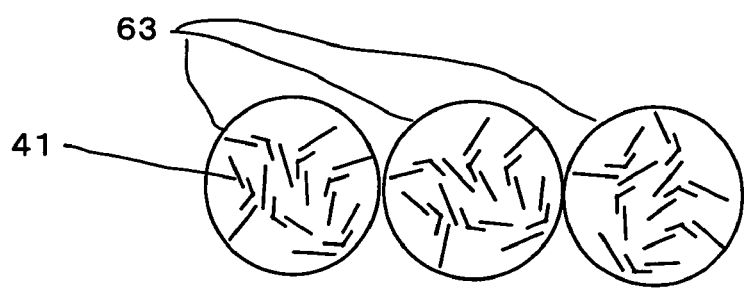
FIG. 11 is a schematic view of a liquid crystal forming an isotropic state in a structure.
Figure 12:
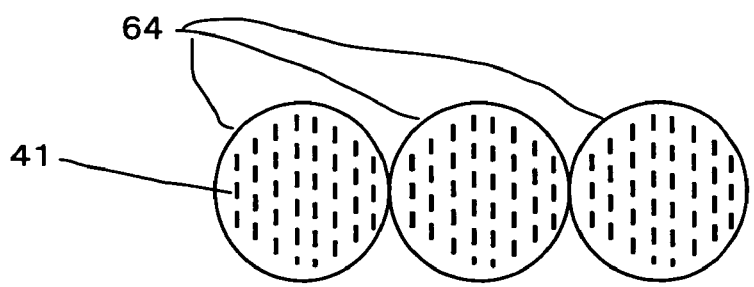
FIG. 12 is a schematic view of a liquid crystal forming an aligned state in a structure loaded with an electric field.
Figure 13:
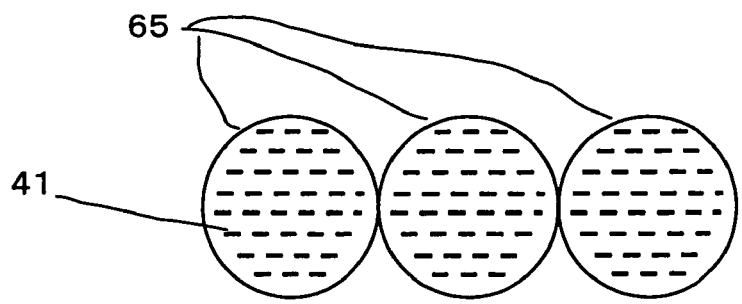
FIG. 13 is a schematic view of a liquid crystal forming an aligned state in a structure loaded with an electric field.

For example, the case that a structure composing periodical structure is spherical is explained using FIGS. 10 to 13. When a liquid crystal forms an aligned phase, a liquid crystal generally receives restriction from spherical surface and aligns as shown by FIG. 10. When a liquid crystal 40 in each structure 62 aligns as shown by FIG. 10, optical anisotropy differs by each sphere. When a liquid crystal forms an isotropic phase, as shown by FIG. 11, a liquid crystal 41 disperses in each structure 63 and forms a state without having optical anisotropy. When voltage is impressed to a structure in a state shown by FIG. 11, a liquid crystal aligns in structure (64, 65) as shown by FIG. 12 or FIG. 13, by dielectric anisotropy of a liquid crystal. By difference between refractive index of a liquid crystal in this alignment and refractive index for periodical structure, incidented light to an intermediate layer reflects and can increase sunlight radiation reflectivity (Re). Which aligned state shown by FIG. 12 or FIG. 13 is formed is determined by positive or negative anisotropic dielectricity of a liquid crystal.

As a structure, a material forming periodic structure and capable of being placed in an intermediate layer may be used. A specific example of a structure includes a polystyrene particle having particle diameter of, for example, 300 nm. A liquid crystal may be filled after a structure is placed in an intermediate layer or, if applicable, each structure filled with a liquid crystal beforehand may be supplied between a front surface layer and a back surface layer. Shape of a structure is not specifically limited as long as periodic structure is formed and may be spherical or a square pole. The size is also not specifically limited, however, to fill a structure in closed packing state, smaller size is preferable.

A front surface layer 10 and a back surface layer 30 are transparent materials. In this application, "transparent" means visible light transmissivity to be not lower than 70%. The front surface layer 10 and the back surface layer 30 are composed of a transparent resin, glass, etc. The front surface layer 10 and the back surface layer 30 may be colorless or colored as long as transparency is secured. Incidentally, "the front surface layer 10" means a layer placed at a light source side and "the back surface layer 30" means a layer placed at an opposite side of the light source side. However, strict differentiation is not necessarily required. For example, when materials to be used as the front surface layer 10 and the back surface layer 30 are the same, each of the layers may be used as the front surface layer.

Size and thickness of the front surface layer 10 and the back surface layer 30 are determined in accordance with applications of an light-modulating material. For example, when a light-modulating material is used as a front glass of an automobile, size of the front surface layer 10 and the back surface layer 30 is determined depending of vehicle design. And thickness is also determined by consideration of light transmittance or strength of a light-modulating material.

A glass material used as the front surface layer 10 and the back surface layer 30 is not specifically limited and a generally used glass is applicable. A glass may be colorless or colored. A specific glass example includes, clear glass, green glass, bronze glass, gray glass, blue glass, UV and heat shielding glass, heat ray absorbing glass, reinforced glass, etc. A mixed glass thereof may be used depending on the cases.

A resin material used as the front surface layer 10 and the back surface layer 30 is not specifically limited and a generally used resin is applicable. The resin may be a thermoplastic type or a thermosetting type. To broaden suitable application fields, thermoplastic resins are suitable. As specific examples, various resin films including aliphatic polyamide such as nylon 66, polyester such as polyethylene terephthalate, polyphenylene sulfide (PPS), polyetheretherketone, polypropylene, etc are suitable in view of processability, economical aspect, availability on the market, recyclability, etc. Among these, polypropylene and polyester are suitable and for example, as polyester, such as polyethylene terephthalate (PET), polybutylene terephthalate (PBT), polyethylene naphthalate (PEN), polybutylene naphthalate (PBN), polyethylene isophthalate (PEI), polybutylene isophthalate (PBI), poly-∈-caprolactone (PCL), etc., along with PET whose ethylene glycol component is substituted by another glycol component (for example, polyhexamethylene terephthalate (PHT)), or terephthalic acid component is substituted by other dibasic acid (for example, pylene isophthalate (PHI), polyhexamethylene naphthalate (PHN)), etc can be used. However, there is no limitation to these.

The front surface layer 10 and the back surface layer 30 may be resin films. When the front surface layer 10 and the back surface layer 30 are resin films, a film-like thin light-modulating material is obtained. Applications of a film-like thin light-modulating material include partition and room interior, etc.

It is also suitable to incorporate a film-like thin light-modulating material and a glass to be used as a light-modulating glass securing transparency. When a film-like thin light-modulating material is prepared to be used as a light-modulating glass, work efficiency in light-modulating glass preparation can be improved. For example, when forming an intermediate layer composed of a liquid crystal between two sheets of laminated glass, filling of a liquid crystal material into two sheets of glass is a relatively time-consuming difficult work. Instead of using such a process, by preparing a film-like light-modulating material filled with a liquid crystal material between resin films, and by adopting a process to place the film-like light-modulating material between two sheets of glass, work efficiency can be improved.

When a film-like thin light-modulating material is prepared by forming an intermediate layer composed of a liquid crystal between resin films, as described above, a pair of transparent glass may be placed at exterior layers of a front surface layer and a back surface layer composed of a resin film. A transparent glass may also be placed at either exterior layer of a front surface layer and a back surface layer composed of a resin film. This embodiment may be prepared by plastering a film-like light-modulating material to a glass.

Materials for resin films composing a front surface layer 10 and a back surface layer 30 include, in addition to the above-described thermoplastic resins, polystyrene, polymethyl methacrylate, polyacrylonitrile, polycarbonate, polybutadiene, polyethylene-2,6-naphthalate, or polymer obtained by using tetramethyleneglycol ether as a monomer. Naturally, a polymer using another monomer may be used, or a copolymer composed of two or more types of monomers may be used. For example, such a copolymer includes a copolymer of styrene and methyl methacrylate, a copolymer of styrene and acrylonitrile, a copolymer of styrene and butadiene or a copolycarbonate of 4,4'-thiodiphenol and bisphenol A, a copolymer of gluterimide and methyl methacrylate.

A light-modulating material of the present invention is adoptable in various applications and suitable ones include a front glass and a front side glass of a vehicle. A front glass and a front side glass of an automobile shall have visible light transmissivity (Tv) not lower than 70% in accordance with a Japanese regulation, for example. A front glass and a front side glass using a light-modulating material of the present invention is useful as measures to reduce sunlight radiation transmissivity (Te), while satisfying regulated visible light transmissivity (Tv) in at least driving time.

Figure 16:
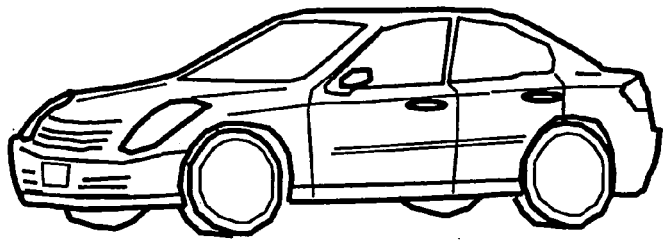
FIG. 16 is a schematic view of MAXIMA™ (V35).
Figure 17:
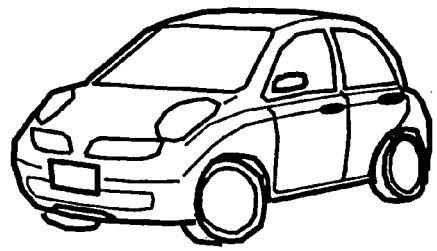
FIG. 17 is a schematic view of MICRA™ (K12).
Figure 18:
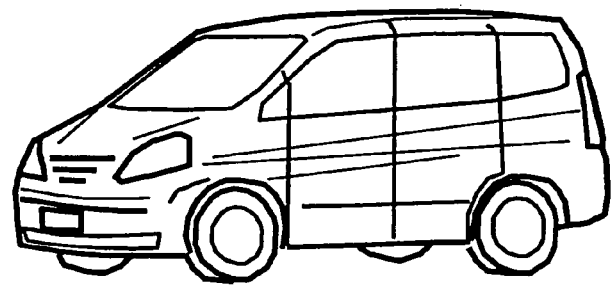
FIG. 18 is a schematic view of SERENA™ (C24).
Figure 19:
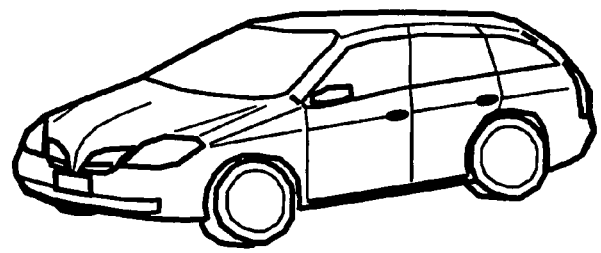
FIG. 19 is a schematic view of PRIMERA™ (WP11).
Figure 20:
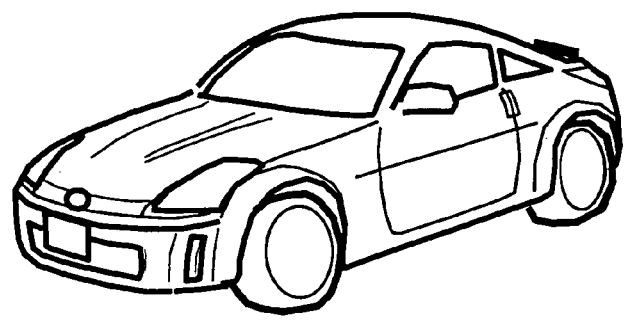
FIG. 20 is a schematic view of 350Z™ (Z33).

A vehicle where a light-modulating material of the present invention can be used covers wide range. For example, it is applicable to various vehicle model such as sedan (MAXIMA™ (V35) from Nissan Motor Co., Ltd.), as shown by FIG. 16, a compact car (MICRA™ (K12) from Nissan Motor Co., Ltd.), as shown by FIG. 17, a mini-van (SERENA™ (C24) from Nissan Motor Co., Ltd.), as shown by FIG. 18, a wagon (PRIMERA™ (WP11) from Nissan Motor Co., Ltd.), as shown by FIG. 19, a sports car (350Z™ (Z33) from Nissan Motor Co., Ltd.), as shown by FIG. 20, etc. It is naturally applicable to a mini motor vehicle, a coupe, SUV, one box and two box types, a van, a truck, etc.

EXAMPLES

Then the present invention is explained using Examples. Optical characteristics of a light-modulating material obtained was evaluated by the following measurements.
(Evaluation of Optical Characteristics)

Visible light transmissivity (Tv) and sunlight radiation transmissivity (Te) were measured in accordance with JIS R3106 using a spectrometer (U-4000 from Hitachi Co., Ltd.). In the following description, evaluation temperature of optical characteristics was 35° C. unless otherwise noted.

Figure 14:
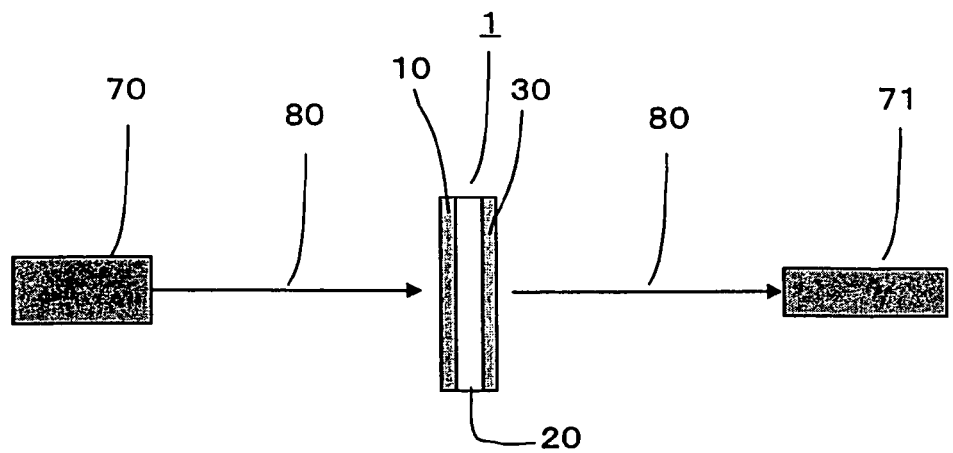
FIG. 14 is a schematic view showing measurement instrument and a material to be measured in evaluation of optical characteristics when incident light angle is 0 degree.
Figure 15:
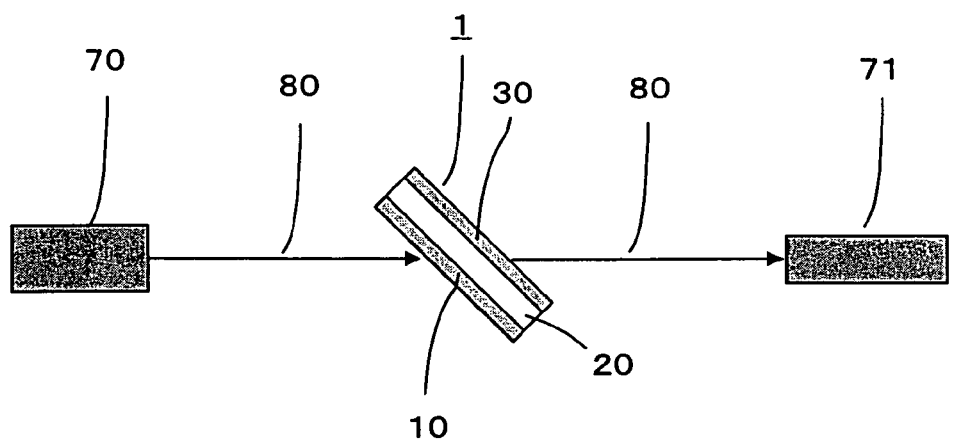
FIG. 15 is a schematic view showing measurement instrument and a material to be measured in evaluation of optical characteristics when incident light angle is 45 degrees.

Outline of a method for evaluation of optical characteristics for incident light angle of 0 degree and 45 degrees is shown in FIGS. 14 and 15. FIG. 14 is a schematic view showing measurement equipment and a material to be measured for optical characteristics for incident light angle of 0 degree. Light beam is emitted from light source 70 and a sample (a light-modulating material) 1 is placed on light axis 80 thereof so that light is introduced at a front surface layer 10. Light passing the front surface layer 10, an intermediate layer 20 and a back surface layer 30 is introduced to a detector 71 to calculate optical characteristics. FIG. 15 is a schematic view showing measurement equipment and a material to be measured for optical characteristics for incident light angle of 45 degrees. Optical characteristics for incident angle of 45 degrees is measured similarly as in FIG. 14 except that the sample (the light-modulating material) 1 is inclined by 45 degrees.

Example 1

As a front surface layer and a back surface layer, a clear glass (Tv: 94%) with thickness of 2 mm and size of 50 mm×10 mm was prepared. Between these front surface layer and back surface layer, a 10 µm thick spacer was set to fill a liquid crystal having an isotropic phase at normal temperature, 4-pentyl-4'-cyanobiphenyl (5CB) and thus a light-modulating material was obtained, wherein a transparent front surface layer, an intermediate layer composed of a liquid crystal forming an isotropic phase and a transparent back surface layer were laminated in this order.

Transmissivity of this sample was measured and found that it showed high transmissivity under both incident angles of 0 degree and 45 degrees. Then as stimulus for light-modulating, temperature was lowered to 10° C., which aligned the liquid crystal and lowered transmissivity. The results are shown in Table 1.

Example 2

Except that an ITO vapor-deposited glass (Tv: 79%) with thickness of 2 mm was prepared as a front surface layer and a back surface layer, a light-modulating material was obtained similarly as in Example 1, wherein a transparent front surface layer, an intermediate layer composed of a liquid crystal forming an isotropic phase and a transparent back surface layer were laminated in this order.

Transmissivity of this sample was measured and found that it showed high transmissivity under both incident angles of 0 degree and 45 degrees. Then as stimulus for light-modulating, DC voltage of 60 V was impressed between the electrode for the front surface layer and the electrode for the back surface layer, which aligned the liquid crystal and lowered transmissivity. The results are shown in Table 1.

Example 3

As a front surface layer, an ITO vapor-deposited glass (Tv: 79%) with thickness of 2 mm was prepared. To this surface layer, polystyrene particles ("5030" from Duke Scientific Co.) with particle diameter of 300 nm were laminated to form periodical structure. While, as a back surface layer, an ITO vapor-deposited glass (Tv: 79%) with thickness of 2 mm was prepared. The front surface layer and the back surface layer were laminated so that periodical structure was aligned between them and a liquid crystal was filled between these layers and thus a light-modulating material was obtained, wherein a transparent front surface layer, an intermediate layer composed of a liquid crystal forming an isotropic phase and a transparent back surface layer were laminated in this order.

Transmissivity of this sample was measured and found that it showed high transmissivity under both incident angles of 0 degree and 45 degrees. Then as stimulus for light-modulating, DC voltage of 150 V was impressed between the electrode for the front surface layer and the electrode for the back surface layer, which aligned the liquid crystal and lowered transmissivity, while visible light reflectivity and sunlight radiation reflectivity were increased.

Example 4

Except that an ITO vapor-deposited polyester film (Tv: 74%) with thickness of 120 µm was prepared as a front surface layer and a back surface layer, a light-modulating material was obtained similarly as in Example 2, wherein a transparent front surface layer, an intermediate layer composed of a liquid crystal forming an isotropic phase and a transparent back surface layer were laminated in this order.

Transmissivity of this sample was measured and found that it showed high transmissivity under both incident angles of 0 degree and 45 degrees. Then as stimulus for light-modulating, DC voltage of 60 V was impressed between the electrode for the front surface layer and the electrode for the back surface layer, which aligned the liquid crystal and lowered transmissivity for incident angle of 45 degrees. The results are shown in Table 1.

Example 5

A light-modulating film obtained in Example 4 was sticked on a clear glass (Tv: 94%) with thickness of 2 mm. Transmissivity of this sample was measured and found that it showed high transmissivity under both incident angles of 0 degree and 45 degrees. Then as stimulus for light-modulating, DC voltage of 60 V was impressed between the electrode for the front surface layer and the electrode for the back surface layer, which aligned the liquid crystal and lowered transmissivity for incident angle of 45 degrees. The results are shown in Table 1.

Example 6

A light-modulating film obtained in Example 4 was sandwiched between 2 sheets of clear glass (Tv: 94%) with thickness of 2 mm. Transmissivity of this sample was measured and found that it showed high transmissivity under both incident angles of 0 degree and 45 degrees. Then as stimulus for light-modulating, DC voltage of 60 V was impressed between the electrode for the front surface layer and the electrode for the back surface layer, which aligned the liquid crystal and lowered transmissivity for incident angle of 45 degrees. The results are shown in Table 1.

Example 7

As a front glass of "MAXIMA™ V35" from Nissan Motor Co., Ltd., a laminated glass was prepared. At the peripheral of the laminated glass, a 10 μm thick spacer was set to fill a liquid crystal (5CB) as an intermediate layer and thus a light-modulating material was obtained, wherein a transparent front surface layer, an intermediate layer composed of a liquid crystal forming an isotropic phase and a transparent back surface layer were laminated in this order.

Transmissivity of this sample was measured and found that it showed high transmissivity under both incident angles of 0 degree and 45 degrees and front view field was sufficiently secured.

Comparative Example 1

Except that 4-octyl-4'-cyanobiphenyl, which is a liquid crystal having an aligned phase at normal temperature, was used as a liquid crystal, a light-modulating material was obtained similarly as in Example 1, wherein a transparent front surface layer, an intermediate layer composed of a liquid crystal and a transparent back surface layer were laminated in this order.

Transmissivity of this sample was measured and found that it showed very low transmissivity under both incident angles of 0 degree and 45 degrees. Then as stimulus for light-modulating, temperature was lowered, which provided no change in transmissivity. The results are shown in Table 1.

Comparative Example 2

Except that 4-octyl-4'-cyanobiphenyl, which is a liquid crystal having an aligned phase at normal temperature, was used as a liquid crystal, a light-modulating material was obtained similarly as in Example 2, wherein a transparent front surface layer, an intermediate layer composed of a liquid crystal and a transparent back surface layer were laminated in this order.

Transmissivity of this sample was measured and found that it showed very low transmissivity under both incident angles of 0 degree and 45 degrees. Then as stimulus for light-modulating, DC voltage of 150 V was impressed between the electrode for the front surface layer and the electrode for the back surface layer, which aligned the liquid crystal and increased transmissivity for both incident angles of 0 degree and 45 degrees. The results are shown in Table 1.

TABLE 1

Performance evaluation results

| | isotropic phase Visible light transmissivity (Tv) | | alignment phase Visible light transmissivity (Tv) | |
|---|---|---|---|---|
| incidence | 0° | 45° | 0° | 45° |
| Example 1 | 87 | 86 | 32 | 28 |
| Example 2 | 77 | 75 | 75 | 54 |
| Example 3 | 74 | 73 | 55 | 54 |
| Example 4 | 72 | 70 | 68 | 59 |
| Example 5 | 72 | 71 | 68 | 60 |
| Example 6 | 70 | 68 | 69 | 59 |
| Example 7 | 72 | 71 | — | — |
| Comparative Example 1 | 10* | 7* | 10 | 7 |
| Comparative Example 2 | 8* | 6* | 75 | 46 |

*aligned phase

As shown in Table 1, a light-modulating material of the present invention enables such design as secure large transmissivity at normal state, while reduced transmissivity when external factors are added such as impression of voltage. Therefore, it is preferable in view of fail-safe. It is also adoptable to such applications as require sufficient transmissivity when it forms an isotropic phase, while requiring transmissivity not lower than certain level such as in a vehicle. Furthermore, it is very good in view of angle dependency of a liquid crystal.

These features are very useful when, for example, it is applied to a front glass of a vehicle. A vehicle using a light-modulating material of the present invention as a front glass can secure transparency necessary in driving and prevent from lowering of transmissivity in accident or failure. In addition to these, it can also prevent penetration of direct sunlight energy into vehicle interior and can provide not only comfortable habitability to occupants but also reduced load in cooling. It leads to great contribution to reduced fuel consumption and $CO_2$ emission volume.

What is claimed is:
1. A light-modulating material, comprising:
a transparent front surface layer; an intermediate layer comprising a liquid crystal; and a transparent back surface layer, laminated in this order, wherein the intermediate layer comprises structures periodically placed therein, wherein the structures comprise the liquid crystal located therein and/or located between the structures, wherein a pair of electrodes is set at the front surface layer and the back surface layer and the liquid crystal is located between the electrodes, and wherein the liquid crystal forms an isotropic phase in a non-electrified state of the electrodes, and the liquid crystal forms an aligned phase in an electrified state of the electrodes, wherein the intermediate layer comprising the liquid crystal that forms the isotropic phase does not have an anisotropic refractive index, and the intermediate layer comprising the liquid crystal that forms the aligned phase has an anisotropic refractive index, wherein the liquid crystal has isotropic phase transition temperature between −40° C. to 40° C. and forms the isotropic phase at a temperature greater than the isotropic phase transition temperature, wherein transmissivity of the intermediate layer in the electrified state is lower than that in the non-electrified state, and wherein the light-modulating material does not include a polarizing plate.

2. A light-modulating material according to claim 1, wherein the isotropic phase of the liquid crystal is created by a dispersion material.

3. A light-modulating material according to claim 1, wherein the liquid crystal is located in the periodic structure inside the intermediate layer.

4. A light-modulating material according to claim 1, wherein the front surface layer and the back surface layer are composed of a glass or a resin.

5. A light-modulating material according to claim 1, wherein the front surface layer and the back surface layer are resin films.

6. A light-modulating material according to claim 5, wherein a pair of transparent glasses is placed at outer surfaces of the front surface layer and the back surface layer.

7. A light-modulating material according to claim 5, wherein a transparent glass is placed at either of the outer surfaces of the front surface layer and the back surface layer.

8. A vehicle comprising the light-modulating material of claim 1 as at least either a front glass or a front side glass.

9. A light-modulating material according to claim 1, wherein the electrodes are transparent.

10. A light-modulating material according to claim 1, wherein the periodic structure comprises polystyrene particles with a particle diameter of 300 nm.

11. A light-modulating material according to claim 1, wherein the material is configured such that when voltage cannot be impressed to the liquid crystal, light transmittance of the material is retained.

12. A light-modulating material according to claim 1, wherein a refractive index of the periodic structures is different from a refractive index of the liquid crystal in the electrified state in relation to light incident to a surface of the light-modulating material.

* * * * *